(12) United States Patent
Harms

(10) Patent No.: US 6,422,533 B1
(45) Date of Patent: Jul. 23, 2002

(54) HIGH FORCE SOLENOID VALVE AND METHOD OF IMPROVED SOLENOID VALVE PERFORMANCE

(75) Inventor: Louis C. Harms, Evanston, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/611,540

(22) Filed: Jul. 7, 2000

Related U.S. Application Data
(60) Provisional application No. 60/143,245, filed on Jul. 9, 1999.

(51) Int. Cl.[7] .............................................. F16K 31/08
(52) U.S. Cl. ..................................... 251/129.1; 355/229
(58) Field of Search ....................... 251/129.1; 355/229, 355/256, 261, 264, 268

(56) References Cited

U.S. PATENT DOCUMENTS

| | | | |
|---|---|---|---|
| 3,149,255 A | * | 9/1964 | Trench ........................ 355/229 |
| 3,842,860 A | | 10/1974 | Stampfli |
| 4,004,258 A | | 1/1977 | Arnold |
| 4,533,890 A | | 8/1985 | Patel |
| 4,690,371 A | * | 9/1987 | Bosley et al. .................. 251/65 |
| 4,779,852 A | | 10/1988 | Lequesne |
| 4,829,947 A | | 5/1989 | Lequesne |
| 5,005,539 A | | 4/1991 | Kawamura |
| 5,069,422 A | | 12/1991 | Kawamura |
| 5,108,070 A | | 4/1992 | Tominaga |
| 5,799,696 A | | 9/1998 | Weiss |
| 5,947,155 A | * | 9/1999 | Miki et al. .............. 137/625.65 |

* cited by examiner

*Primary Examiner*—John Fox
(74) *Attorney, Agent, or Firm*—Renner, Otto, Boisselle & Sklar LLP

(57) ABSTRACT

A solenoid valve includes an armature having two permanent magnets axially spaced apart with a steel spacer therebetween. The permanent magnets act as magnetic flux diodes to reduce or prevent undesired forces on the armature due to parasitic magnetic flux. The magnets have stepped outer ends which, in conjunction with pole pieces having corresponding stepped pole piece ends, concentrate magnetic flux to increase the magnetic force on the armature.

20 Claims, 2 Drawing Sheets

HIGH FORCE SOLENOID VALVE AND METHOD OF IMPROVED SOLENOID VALVE PERFORMANCE

This application claims priority from U.S. Provisional Application No. 60/143,245, filed Jul. 9, 1999.

FIELD OF THE INVENTION

The present relates to solenoid valves and methods of improving performance of solenoid valves.

BACKGROUND OF THE INVENTION

Solenoids, devices made of wire tightly packed into cylindrical coils, are widely used in a variety of applications to convert electrical current into mechanical motion. When current is sent through the coil, a magnetic field is induced within the coil. The magnetic field may be used to move an armature within the coil.

In solenoid valves the movement of the armature is used to move a spool or other valve member which controls flow of a fluid. Changes in the fluid flow such as initiation of flow through the valve may result in fluid forces, such as Bernoulli forces, that oppose the magnetic forces moving the armature and the spool or other valve member. Accordingly, it will be appreciated that it would be advantageous to have solenoid valves that are able to move an armature with greater force.

SUMMARY OF THE INVENTION

A method of improving solenoid valve performance includes suppressing or counteracting at least a portion of the effects of parasitic magnetic flux. A solenoid valve according to the invention eliminates or substantially reduces the flux path for a parasitic magnetic flux which would otherwise travel partially through a housing around a solenoid which is not energized. The parasitic flux path may be eliminated by placing a magnetic block in what would otherwise be the parasitic flux path. According to a particular aspect of the invention, the solenoid valve includes an armature having a pair of permanent magnets with a spacer therebetween.

According to another aspect of the invention, a solenoid valve includes an armature having stepped armature ends and pole pieces having stepped pole piece ends corresponding to the stepped armature ends.

According to still another aspect of the invention, a solenoid valve includes a pair of coils which are independently energizable, and an armature operatively coupled to the coils, the armature having a pair of spaced-apart permanent magnets with poles of each of the magnets being oriented in the spaced-apart direction.

According to a further aspect of the invention, a method of operating a solenoid valve includes energizing one of a pair of independently energizable coils that surround respective ends of an armature, and at least partially preventing parasitic leakage through a flux path that includes the end surrounded by the other of the coils.

According to a still further aspect of the invention, a solenoid valve includes an armature operatively coupled to a coil, the armature having a stepped armature end, and a pole piece having a stepped pole piece end corresponding to the stepped armature end.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
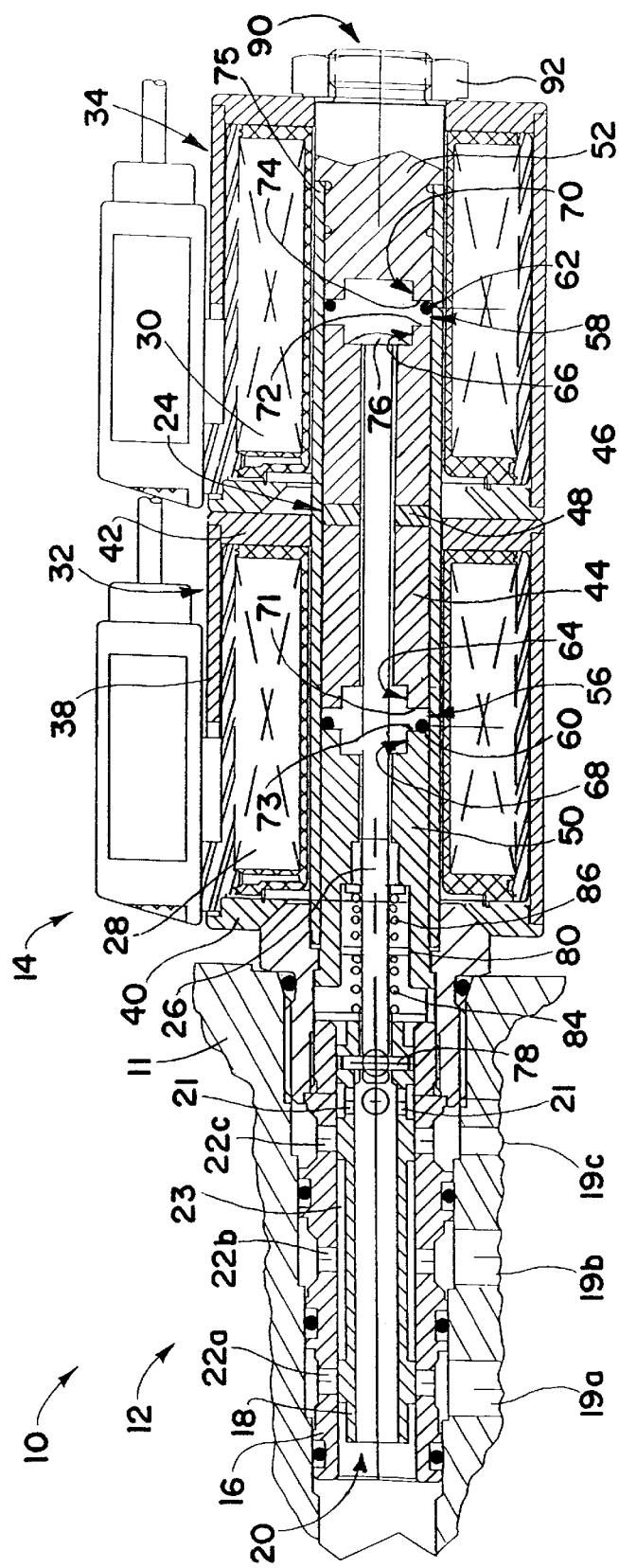
FIG. 1 is a side sectional view of a solenoid valve of the present invention.

In FIG. 1, a solenoid valve 10 according to the present invention is shown. The solenoid valve 10 is installed in a valve housing 11 by well-known suitable means, and includes a valve portion 12 and a solenoid portion 14. The illustrated valve portion 12 is of a conventional design, with a stepped valve portion sleeve 16 enclosing a spool 18. The sleeve 16 and the spool 18 cooperate to selectively place various of ports 19a–c of the valve housing in communication with one another via a bore 20 and holes 21 in the spool 18, via holes 22a–c in the sleeve 16, and via flow passage 23 between the sleeve 16 and the spool 18.

Positioning of the spool 18 is effected by positioning an armature 24 which is part of the solenoid portion 14, the armature 24 and the spool 18 being coupled by a connecting rod 26. The armature 24 is moved by selectively energizing coils 28 and 30, the coils when energized inducing a magnetic field that moves the armature 24. The magnetic field induced by the coils 28 and 30 is amplified by respective containers or housings 32 and 34. The housings 32 and 34 each provide ferromagnetic material such as steel along the outside of the coils and along the ends of the coils, such as in an outer cover 38 and end covers 40 and 42. The coils and housings may be identical to one another or may be different.

As explained in greater detail below, energizing one of the coils 28 and 30 can produce a parasitic flux through a conducting flux path which includes the housing of the other coil. This parasitic flux opposes the desired movement of the armature 24 effected by the magnetic field through the main flux path, i.e. the flux path through the housing of the energized coil. In order to reduce or eliminate the effect of this parasitic flux the armature 24 includes axially spaced apart tubular magnets 44 and 46 with a spacer 48 therebetween. The spacer may be made of a ferromagnetic material such as mild steel. The magnets 44 and 46 have their poles axially oriented, and in effect act as magnetic flux diodes, preventing or counteracting the undesired magnetic forces due to the parasitic flux.

Pole pieces 50 and 52 are located at opposite respective ends of the armature 24, thus defining air gaps 56 and 58 between the armature 24 and the respective pole pieces 50 and 52. Energizing one of the coils 28 and 30 causes movement of the armature 24 to reduce or close the respective air gap 56, 58 within the energized coil. Respective mechanical stops 60 and 62 are provided in the air gaps 56 and 58 to prevent contact between the magnets 44 and 46 in the respective pole pieces 50 and 52. Such contact between magnet and pole piece results in latching, a condition wherein the armature 24 is firmly coupled to a pole piece. Latching is generally undesirable since a large force may be required to unlatch a latched armature and pole piece. Preferably the mechanical stop maintains a residual air gap of at least about 0.010 to 0.015 inches between the armature and the pole pieces. The mechanical stops may be nonmagnetic parts such as discs or rings that may be attached to the ends of the armature 24 or the ends of the pole pieces 50 and 52. Alternatively the mechanical stops may be freely floating, attached to neither the armature nor the pole pieces. It will be appreciated that there are a wide variety of other alternative ways of limiting the travel of the armature 24 so as to avoid direct contact with either of the pole pieces 50 and 52, for example by providing mechanical constraints on armature movement that do not involve placing a stop between the armature and the pole pieces.

The magnets 44 and 46 have respective stepped magnet ends 64 and 66 at the outer ends of the armature 24. The pole pieces 50 and 52 have corresponding stepped pole piece ends 68 and 70 opposite the stepped magnet ends 64 and 66. The air gaps 56 and 58 between the pole pieces 50 and 52 and the armature 24 is smaller across the stepped ends than at other places between the pole pieces 50 and 52 and the armature 24. The stepped (preferably annular) magnet ends 64 and 66 and the stepped (preferably annular) pole piece ends 68 and 70 therefore concentrate the magnetic flux between the armature 24 and the pole pieces 50 and 52 in the vicinity of the stepped ends. Since the attractive force between the armature and the pole pieces varies with the square of the magnetic flux density, concentrating the flux density into a small area increases the force between the armature and the pole pieces.

The respective end surfaces 71 and 72 of the stepped magnet ends 64 and 66 are preferably parallel to corresponding respective end surfaces 73 and 74 of the stepped pole piece ends 68 and 70. The end surfaces 71–74 are also preferably oriented relative to the magnetic flux lines between the stepped ends in the manner shown. However, it will be appreciated that alternatively other end shapes may be employed in concentrating the magnetic flux between the armature 24 and the pole pieces 50 and 52.

The armature 24 and the pole pieces 50 and 52 are preferably enclosed by a sleeve 75. The sleeve 75 is preferably made of a nonmagnetic material such as stainless steel, in order to avoid creating a flux path through the sleeve 75 for the magnetic field induced by running a current through the coils 28 and 30.

As shown, the connecting rod 26 may be connected to the armature 24 by a riveted end 76. The connecting rod 26 may be connected to the spool 18 by a pin 78 through the rod 26 and the spool 18. It will be appreciated that other means of connecting the connecting rod 26 to the armature 24 and/or to the spool may alternatively be used.

The connecting rod 26 has an attached interface disc 80. Centering springs 84 and 86 press against the interface disc 80 and serve to center the armature 24 between the pole pieces 50 and 52 if neither of the coils 28 and 30 is energized. The centering springs 84 and 86 must be sufficiently strong to prevent movement of the armature 24 due to the attractive forces between the magnets 44 and 46 and the respective pole pieces 50 and 52, without being so strong that the magnetic force on the armature 24 induced by energizing the coils 28 and 30 will be insufficient to move the armature 24 with sufficient speed. It will be appreciated that resilient devices other than the centering springs shown may alternatively be used to maintain the armature centered between the pole pieces when neither of the solenoids is energized. As will be further appreciated, the illustrated solenoid valve is a three position valve, one position being a null position (unenergized) and the other two positions be effected by energizing a respective coil.

The pole piece 52 may have a threaded end 90 for receiving a nut 92. The nut 92 functions to hold the pole piece 52 within the solenoid portion 14 and to hold the solenoid portion 14 and the valve portion 12 together.

Figure 2:
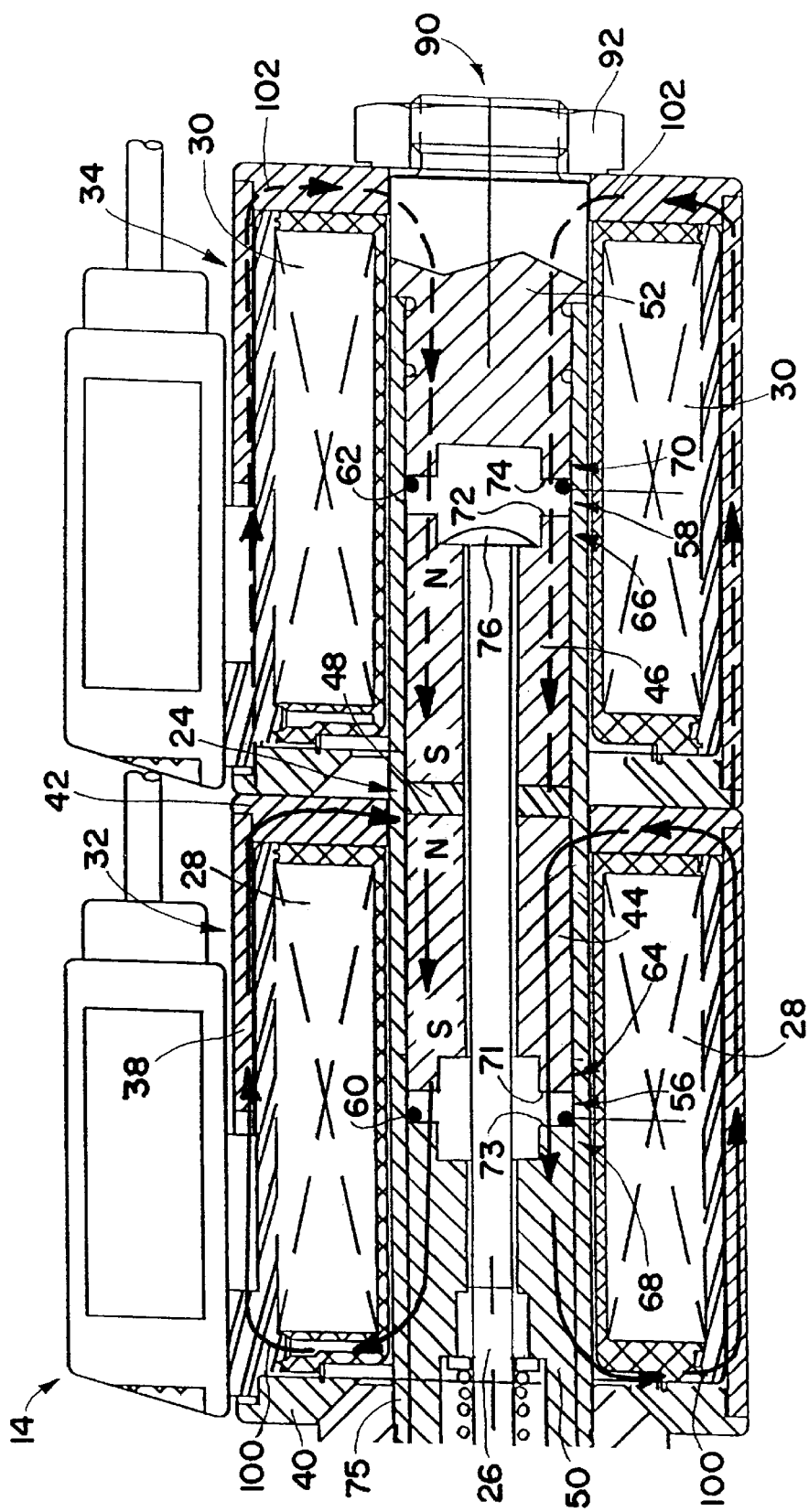
FIG. 2 is a side sectional view of the solenoid portion of the solenoid valve of FIG. 1, showing magnetic flux lines due to energization of the one of the coils.

Referring now to FIG. 2, flux paths through the solenoid portion 14 are shown for the case where the coil 28 is energized. Energizing the coil 28 produces a main flux through the housing 32, the magnet 44, and the pole piece 50, the main flux being indicated in FIG. 2 by arrows 100 having solid lines. The main flux 100 produces an attractive main flux force between the magnet 44 and the pole piece 50 which tends to pull the armature 24 toward the pole piece 50. The main flux force is in addition to the normal attractive force between the magnet 44 and the pole piece 50 due to the magnetic field of the magnet 44.

In addition to the main flux 100, energizing the coil 28 attempts to produce a parasitic flux traveling in part through the housing 34, the pole piece 52 and the magnet 46, the parasitic flux being indicated in FIG. 2 by arrows 102 having broken lines. The strength of the parasitic flux 102 is expected to be less than that of the main flux 100 purely from geometric considerations, since the flux path for the parasitic flux 102 is longer than the flux path for the main flux 100. Nonetheless, in a conventional solenoid valve including a conventional ferromagnetic armature, the parasitic flux 102, if unopposed, would produce an attractive parasitic flux force between the armature and the pole piece 52. The parasitic flux force would be in the opposite direction from and opposed to the main flux force.

However, the presence in the armature 24 of the magnet 46 will block the parasitic flux 102. The parasitic flux 102 will be unable to pass through the magnet 46 since in order to do so the polarity of the magnet 46 would have to be reversed. The magnet 46 therefore essentially acts like a magnetic flux diode, allowing magnetic flux to pass through only in one direction, the direction aligned with the polarity of the magnet. In other words, the magnetic field produced by the magnet 46 opposes the parasitic magnetic field induced by the energization of the coil 28. Preferably the magnets 44 and 46 are strong enough to counteract completely or at least substantially the parasitic magnetic field.

By reducing or removing the detrimental effect of the parasitic flux, the solenoid operating force may be increased as much as 30% to 50% over a similar solenoid with a conventional (nonmagnetic) armature. Thus a solenoid of the present invention is able to actuate a valve with larger flows or pressures when compared with a similar solenoid with a conventional armature. Alternatively, a smaller solenoid of the present invention may be employed to perform the task of a larger similar solenoid of conventional design. The ability to use a smaller solenoid may result in savings of weight, space, and/or power required. Such a solenoid with improved performance may produce less heat during operation than a conventional solenoid.

It will be appreciated that by increasing the solenoid operating force, the spring force of the centering spring may be increased from that used for a similar solenoid valve with a conventional armature, while maintaining the same or an improved initial rate of movement of the armature upon energization of one of the coils. An increased centering spring force is beneficial from the standpoint of the increased force with which the armature is returned to the center null position when a coil is de-energized.

In an exemplary embodiment, the solenoid valve is a three-position four-way cartridge directional control valve. The solenoid portion has an overall length of approximately 4.4 inches, and tubular magnets in the armature each have a strength of 1.4 Tesla.

It will be appreciated that the concepts of the present invention may be employed, with suitable modification, to improve performance in a wide variety of hydraulic and pneumatic solenoid valves, including two-position two-way valves, two-position three-way valves, and two-position four-way valves.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A solenoid valve comprising:
a pair of coils which are independently energizable; and
an armature operatively coupled to the coils, wherein the armature includes a pair of spaced-apart permanent magnets with poles of each of the magnets being oriented in the spaced-apart direction;
wherein the poles of the magnets have the same orientation.

2. The solenoid valve of claim 1, wherein the armature has a steel spacer between the magnets.

3. The solenoid valve of claim 1, wherein the magnets are tubular.

4. The solenoid valve of claim 3, further comprising a connecting rod passing through the armature and to which the magnets are connected for common movement.

5. The solenoid valve of claim 1, wherein the coils and the magnets are coaxial.

6. The solenoid valve of claim 1, wherein the valve is a three position, four way valve.

7. A solenoid valve comprising:
a pair of coils which are independently energizable;
an armature operatively coupled to the coils; wherein the armature includes a pair of spaced-apart permanent magnets with poles of each of the magnets being oriented in the spaced-apart direction; and
a pair of pole pieces on respective opposite sides of the magnets,
wherein at least one of the magnets has a stepped end for concentrating magnetic flux; and
wherein at least one of the pole pieces has a stepped end for concentrating magnetic flux.

8. The solenoid valve of claim 7, wherein the magnets are tubular, and wherein the coils and the magnets are coaxial.

9. The solenoid valve of claim 8, further comprising a connecting rod passing through the armature and to which the magnets are connected for common movement.

10. The solenoid valve of claim 7, wherein the poles of the magnets have the same orientation.

11. A solenoid actuator comprising:
a pair of axially aligned coils; and
an armature axially disposed with the coils, wherein the armature includes a pair of axially disposed permanent magnets respectively associated with the coils;
wherein poles of the magnets are axially oriented; and
wherein the poles of the magnets have the same orientation.

12. A solenoid valve comprising:
first and second coils that are independently energizable;
an armature operatively coupled to the coils; and
first and second pole pieces on opposite respective sides of the armature, with respective first and second air gaps between the pole pieces and the armature;
wherein the armature includes first and second permanent magnets spaced apart from each other;
wherein the first magnet is at least partially within the first coil;
wherein the second magnet is at least partially within the second coil;
wherein the first pole piece is at least partially within the first coil; and
wherein the second pole piece is at least partially within the second coil.

13. The solenoid valve of claim 12, further comprising a first stop in the first air gap, between the armature and the first pole piece, and a second stop in the second air gap, between the armature and the second pole piece; wherein the stops are made of a nonmagnetic material.

14. The solenoid valve of claim 12, wherein the magnets are tubular.

15. The solenoid valve of claim 14, further comprising a connecting rod passing through the armature and to which the magnets are connected for common movement.

16. The solenoid valve of claim 14, wherein the magnets have stepped outer magnet ends that concentrate magnetic flux between the magnets and the pole pieces.

17. The solenoid valve of claim 14, wherein the pole pieces have stepped outer pole piece ends that concentrate magnetic flux between the magnets and the pole pieces.

18. The solenoid valve of claim 14, wherein the coils, the magnets, and the pole pieces, are all coaxial.

19. The solenoid valve of claim 12, wherein the armature includes a spacer between the magnets.

20. The solenoid valve of claim 12, wherein poles of the magnets have the same orientation, such that a north pole of one of the magnets is closer to a south pole of the other magnet than to a north pole of the other magnet.

* * * * *